United States Patent [19]

Montgomery

[11] Patent Number: 5,443,636
[45] Date of Patent: Aug. 22, 1995

[54] COMPOSITION FOR AND METHOD OF PUMPING CONCRETE

[75] Inventor: Daniel P. Montgomery, Mesquite, Tex.

[73] Assignee: Fritz Industries, Inc., Mesquite, Tex.

[21] Appl. No.: 282,879

[22] Filed: Jul. 29, 1994

[51] Int. Cl.⁶ ............................................. C04B 24/10
[52] U.S. Cl. .................................... 106/805; 106/804; 106/197.1; 106/197.2; 106/205; 106/208
[58] Field of Search ..................... 106/804, 805, 197.2, 106/205, 208, 197.1; 166/294, 300, 308

[56] References Cited

U.S. PATENT DOCUMENTS

| | | | |
|---|---|---|---|
| 3,766,984 | 10/1973 | Nimerick | 166/294 |
| 3,888,312 | 6/1975 | Tiner et al. | 166/308 |
| 4,033,415 | 7/1977 | Holtmeyer et al. | 166/308 |
| 4,378,049 | 3/1983 | Hsu et al. | 106/208 |
| 4,961,790 | 10/1990 | Smith et al. | 106/823 |
| 4,964,917 | 10/1990 | Bobrowski et al. | 106/804 |
| 5,120,367 | 6/1992 | Smith et al. | 106/823 |
| 5,203,919 | 4/1993 | Bobrowski et al. | 106/802 |

OTHER PUBLICATIONS

Slick-Pak product bulletin 125 "Concrete Pump Primer & Pumping Aid." Oct. 1993 2 Pages.
Material Safety Data Sheet Fritz Industries, Slick-Pak Oct. 1993 2 Pages.
Slick-Pak Test Results Feb. 1994 1 Page.
The Prime Solution Fritz Slick-Pak Apr. 1994 2 Pages.
Job Story "Concrete Pumping Company Proves Economy & Efficiency of New Priming Solution" Apr. 1994 2 Pages.

*Primary Examiner*—Mark L. Bell
*Assistant Examiner*—Michael Marcheschi
*Attorney, Agent, or Firm*—Thomas R. Weaver

[57] ABSTRACT

A composition for and a method of promoting the flow of a concrete slurry through a pump and a conduit is provided. The composition is a dry particulate mixture comprised of a water soluble, inorganic material and a solvatable, organic polymer. The composition, when mixed with a suitable quantity of water, is useful in a method of priming a pump used to pump a concrete slurry. The composition, when mixed with a concrete slurry, is useful to improve the flow of the slurry through a conduit.

13 Claims, No Drawings

COMPOSITION FOR AND METHOD OF PUMPING CONCRETE

BACKGROUND OF THE INVENTION

1. Technical Field of the Invention

This invention broadly relates to concrete. It further relates to materials added to concrete or otherwise employed therewith to adjust the properties or to enhance and/or to facilitate the use thereof. This invention further, and more specifically, relates to an additive composition for and a method of promoting the flow of concrete and particularly the flow thereof through a pump and a conduit.

2. Description of the Prior Art and Problems Solved

It is well known that concrete is useful as a basic and highly versatile material of construction. The versatility of concrete stems, at least in part, from the fact that concrete initially occurs in a fluid condition, which, after a period of time, converts into a monolithic solid condition. In the fluid condition, concrete, being comprised of discrete solids dispersed in water, has little or no compressive strength; it can be pumped; and it will flow into and assume the shape of a container, referred to in the art as a form. After a period of time, the fluid concrete sets into the dense, rigid, monolithic solid condition having the shape of the form and exibiting substantial compressive strength.

For purposes of this disclosure, the fluid condition of concrete, which is referred to in the concrete construction art as "plastic concrete," featuring the dispersion of solids in water, is referred to herein as a concrete slurry, and the monolithic solid condition of concrete is referred to herein as set concrete. The dispersed solids are usually comprised of hydraulic cement and aggregate wherein the aggregate ordinarily, but not always, consists of graded coarse aggregate, i.e. rock, mixed with graded fine aggregate, i.e. sand.

It is known that a concrete slurry can be prepared for use in one location, which can be remote from the place of its intended use, and then conveniently transported by known means, such as in a truck, to the place of its intended use. It is also known that a concrete slurry can be prepared while being transported to the intended place of use. A truck ordinarily employed to transport a concrete slurry is referred to in the art as a ready mix truck.

When a concrete slurry is delivered to the intended location of use, it is known that it can be caused to flow by gravity or by pumping into a form where, because of its fluid condition, it conforms to the shape of the form. After the concrete slurry is in the form it is permitted to remain undisturbed therein for a period of time sufficient to enable the cementious material to hydrate to thereby produce the set concrete.

One of the problems involved in the placement of a concrete slurry, which is the problem specifically addressed in this disclosure, concerns the potential difficulty of causing the slurry to flow through a conduit. In this regard, it is sometimes necessary, or otherwise convenient, to place the slurry in the desired form by pressuring it, by means of a pump, through a conduit over a distance to the desired form. However, due to the nature of a concrete slurry, it has sometimes been found essential, in order to initiate movement of a slurry to and through the pump and conduit, to first fill the pump used to pressure the slurry through a conduit with a fluid which is easily pumped and which will lubricate the conduit itself, followed by pumping such fluid ahead of the slurry. The process of filling a pump with a fluid which is easily pumped followed by pumping in order to initiate slurry movement is referred to as priming.

It is known that a concrete slurry which contains coarse aggregate which is irregular in size and/or shape and/or which contains solids which are not uniformly dispersed in the water phase and/or which has a low volume ratio of hydraulic cement to total concrete slurry cannot be pumped easily, if at all, unless the pump is first primed.

A concrete slurry having a low volume ratio of hydraulic cement to slurry, which is known in the art as a low strength mix, does not contain sufficient hydraulic cement to lubricate the pump, conduit and aggregate to enable satisfactory slurry flow. It is believed that a low volume ratio of hydraulic cement to slurry is one featuring about 10 volume parts or less of hydraulic cement per 100 volume parts of concrete slurry.

The flow of a concrete slurry which includes coarse aggregate which is not of proper size gradation, as set out in ASTM C33-92a (Std. Spec. for Concrete Aggregates), or which is angular or broken or in which solids are not uniformly dispersed in the water phase or any combination thereof will tend to be at least impeded and perhaps even will be completely blocked and will, accordingly, require the application of priming.

It is highly desireable that the combination of aggregate, water and hydraulic cement act together in the flowing slurry to produce a condition, referred to in the art as the ball bearing effect, which results in the smooth and uninterrupted flow of the concrete slurry.

Coarse and fine aggregates often used in the formulation of a concrete slurry are not the type which will produce the ball bearing effect principally due to the fact that the more desireable type of coarse aggregates, i.e. aggregates which are round, smooth, unbroken and of proper size gradation, are in short supply or are simply not available in view of various factors including the high demand for concrete construction and decreasing convenient sources of such aggregates. Accordingly, the need for improved compositions for and methods of priming a concrete pump and lubricating a conduit to ease slurry flow is current and will continue to increase with the passage of time.

The prior art has addressed the problem of priming a concrete slurry pump by employing methods featuring the use of two different compositions, one of which is called a "priming grout mix" and the second of which is called a "priming slurry." The methods of priming a concrete slurry pump with either a priming grout mix or a priming slurry, as heretofore employed, are similar and suffer a common disadvantage. The disadvantage originates from the fact that the concrete slurry being pumped is not compatible and cannot be admixed with either one of the prior art priming compositions because any such admixture adversely affects the strength of the set concrete. Accordingly, when employing either one of the prior art methods, the delivery end of the conduit cannot be placed in the form until all of the priming composition has exited therefrom in order to avoid any admixing of slurry and priming composition.

Because the prior art compositions cannot be admixed with the concrete slurry, as explained above, the priming compositions must be directed to and placed in a separate location to enable hydration and subsequent disposal thereof. Accordingly, a waste disposal and potential environmental hazard inherently accompanies the use of prior art priming compositions.

Thus a problem to be solved is to devise a composition for and a method of priming a concrete slurry pump which will not only permit a slurry to be successfully pumped, but which will also avoid the waste disposal and environmental problems associated with methods currently employed.

A priming grout mix usually consists of concrete sand, hydraulic cement and water in the weight ratio of 10 to 2 to 1, respectively. In typical practice about one-half cubic yard of priming grout mix is placed in a ready mix truck which then transports the mix to the location of the concrete slurry pump, which is ordinarily a positive displacement pump; the mix is there employed to prime the pump in order to cause a concrete slurry to move through the pump and conduit to the desired form. In the example just cited, one-half cubic yard of priming grout mix includes about 1500 pounds of sand, 300 pounds of dry cement and 150 pounds of water. In view of the fact that a ready mix truck ordinarily holds at least about 8 cubic yards of material it is apparent that a truck employed to transport a priming grout mix is dramatically under utilized in that it is solely used to transport a material which cannot be added to the concrete slurry.

A priming slurry typically consists of one bag of hydraulic cement dispersed in 6 or 7 gallons of water. As used herein, a bag of cement weighs about 94 pounds; since a gallon of water weighs about 8.33 pounds, the weight ratio of cement to water in a typical priming slurry is an amount in the range of from about 1.6 to about 1.9 pounds of cement per pound of water. In practice about one-half of the required cement and water is thoroughly mixed and added to an apparatus, referred to in the art as a hopper, which is in direct fluid communication with the suction side of the concrete pump, thereafter the balance of the cement and water is thoroughly mixed and added to the hopper prior to the initiation of pumping.

Although use of a priming slurry does not involve an extra ready mix truck, as is required in the case of a priming grout mix as described above, it is required that extra bags of dry cement be transported to the pump location to enable on-site preparation of the the priming slurry.

DISCLOSURE OF INVENTION

1. Summary of the Invention

It has now been discovered that a composition comprised of a water soluble, inorganic, alkaline material in combination with a solvatable, organic, polymeric material, when mixed with a quantity of water sufficient to dissolve the alkaline material and solvate the polymeric material, is broadly useful to improve the fluid characteristics of a concrete slurry. In one specific aspect the composition of this invention finds application in a method of pressuring, such as in a pump, a concrete slurry through a conduit. In a second specific aspect the composition of this invention finds application in a method of improving the ability of a concrete slurry to flow in any channel, such as in a closed conduit or in an open trough, either by gravity or by some externally applied mechanical means.

The composition, when mixed with a sufficient quantity of water as mentioned above, forms a fluid, referred to herein as a sol, having an alkaline pH, preferably in the range of from about 11 to 12, and having a concentration in the range of from about 0.5 to about 3.5, preferably from about 1 to about 3 and still more preferably from about 1 to about 2 pounds of the composition per 100 pounds of sol. The preferred fluid contains about 1.2 pounds of composition per 100 pounds of sol. The above concentrations can also be expressed in terms of pounds of water per pound of composition wherein water is present in the range of from about 27 to about 210, preferably from about 35 to about 100 and still more preferrably from about 50 to about 100 pounds of water per pound of composition. The preferred fluid contains about 83.3 pounds of water per pound of composition.

The above concentrations are stated in terms of pounds of composition per 100 pounds of sol, or as pounds of water per pound of composition. However, it is customary, and consequently preferred, in the art to express the concentration of the composition in terms of pounds of composition per gallon, or gallons, of water. It is still further preferred, as is explained below, to express the usage, or dosage, rates of the composition in units of 0.5 pound of composition per gallon, or gallons, of water, or per ready mix load of concrete slurry. It is to be understood, however, that the dosage rates disclosed herein produce concentrations within the scope of the concentration weight ranges which are disclosed above and set out in the appended claims.

The composition, which is sometimes referred to herein as an additive for concrete and sometimes as the additive of this invention, when employed in the above mentioned method of pressuring a concrete slurry through a conduit, is referred to in the art as a priming aid, and when employed in the above mentioned method of improving the ability of a concrete slurry to flow, is referred to in the art as a pumping aid. For convenience, the composition, especially when in the form of the alkaline sol, is broadly referred to herein by its perceived function as a lubricant. It is believed, as explained below, that the composition also functions to help reduce the loss of water from the concrete slurry.

The composition can be mixed with a concrete slurry without causing any deleterious effect on the slurry or the set concrete. Thus, use of the additive of this invention avoids the environmental problems of prior art priming compositions, as mentioned above, because use of the additive of this invention does not create a disposal problem in that the composition can be mixed with the concrete slurry.

The quantity of the composition of this invention required for use is so small, that use of separate ready mix trucks devoted solely to transportation of the composition is not required. In this regard when the composition is used as a priming aid, only about 0.5 pound of composition per five gallons of water, i.e. about 41.65 pounds of water per 0.5 pound of additive, is sufficient to prime a pump used to pressure a concrete slurry through about 100 feet of a five-inch diameter conduit.

When the composition is used as a pumping aid, about 0.5 to about 3.0 pounds of composition per ready mix load of concrete slurry is required to adequately lubricate the slurry through conduit normally employed in the art. A ready mix load of concrete slurry for purposes of this disclosure is defined to be about eight cubic yards which has a weight in the range of from about 3240 to about 82080 pounds and preferably in the range of from about 30,240 to about 32,400 pounds. Accordingly, the quantity of composition, when used as a pumping aid, is an amount in the range of from about 1 pound per 1000 pounds to about 1 pound per 165000 pounds, preferably in the range of from about 1 pound per 10000 pounds to about 1 pound per 100000 pounds and still more preferably in the range of from about 1 pound per 20,000 pounds of concrete slurry to about 1 pound per 65,000 pounds of concrete slurry.

2. Description of the Preferred Embodiments

The composition of this invention, a dry, particulate material, is comprised of a water soluble, inorganic, alkaline material in combination with a solvatable, organic, polymeric material which, when mixed with a quantity of water sufficient to dissolve the alkaline material and solvate the polymeric material, is broadly useful to improve the fluid characteristics of a concrete slurry. The concentration of said alkaline material in the composition is an amount in the range of from about 40 to about 99, preferably from about 60 to about 90 and still more preferably from about 70 to about 85 parts by weight of said alkaline material per 100 parts by weight of said composition.

The concentration of said polymeric material in said composition is an amount in the range of from about 1 to about 60, preferably from about 10 to about 40 and still more preferably from about 15 to about 30 parts by weight of said polymeric material per 100 parts by weight of said composition.

The composition of this invention, to be useful as contemplated herein, must be mixed with a quantity of water sufficient to dissolve the alkaline material and to solvate the polymeric material to thereby form the above referred to alkaline sol. In this regard, when the composition is used as a priming aid, all of the composition to be employed can be first mixed in a container with a quantity of water sufficient to form the sol, the sol can then be placed in a vessel which is in fluid communication with the suction side of the concrete pump and then the sol is pressured by the pump from the vessel into and through a conduit to a form. The vessel into which the sol is placed and from which the sol is pumped is referred to in the art as a hopper. While the sol is being pressured into the conduit from the hopper, and at least before all of the sol is pumped from the hopper, the concrete slurry to be pumped is added to the hopper such that a final portion of the sol is in contact with the initial portion of the concrete slurry whereby the sol precedes the slurry through the pump and conduit to the form. While not intending to be bound by a particular theory of operation, it is believed that the sol and concrete slurry do not substantially intermix one with the other, and that the sol, instead, moves in a cohesive unit, i.e., a plug, through the pump and conduit ahead of the concrete slurry while forming a thin film of the sol on the functioning parts of the pump and on the interior walls of the conduit to thereby lubricate the pump and conduit so as to ease the movement of the slurry therethrough. It is further believed that the film of sol also acts, indirectly, as a hydration aid in that it helps prevent the loss of water, needed to completely hydrate the hydraulic cement, from the concrete slurry to the conduit. In an alternative and preferred method of operation, the composition can be mixed with the water directly in the hopper instead of in a separate container which is thereafter added to the hopper.

Thus, by this invention, there is provided a method of pressuring a concrete slurry through a conduit, the method being comprised of the steps of introducing a fluid composition into a chamber; placing the chamber in fluid communication with the inlet end of the conduit; applying pressure to the fluid composition in the chamber in an amount sufficient to cause the fluid composition to flow from the chamber into and through the conduit to the outlet thereof: and, thereafter, while continually applying the pressure, introducing the concrete slurry into the chamber such that the final portion of the fluid composition is contacted by the initial portion of the slurry whereby the concrete slurry is pressured into and through the conduit to the outlet.

The fluid composition is comprised of an additive material mixed with water, the additive material being comprised of a water soluble, inorganic, alkaline material and a solvatable, organic polymeric material. The concentration of the alkaline material in the additive is an amount in the range of from about 40 to about 99 parts per 100 parts by weight of the additive, the concentration of the polymeric material in the additive is an amount in the range of from about 1 to about 60 parts per 100 parts by weight of the additive. The water is present in the fluid composition in an amount sufficient to dissolve the alkaline material and solvate the polymeric material.

When the composition is used as a pumping aid, it is added directly to a concrete slurry and mixed therewith for a time sufficient to obtain a uniform dispersion of the composition in the slurry. It is not required that additional water also be added to the slurry, because water in the slurry is present in an amount sufficient to dissolve the alkaline material and solvate the polymeric material without depriving the slurry of water required to completely hydrate the cement. A uniform dispersion can be obtained by mixing the composition with a concrete slurry in a conventional ready mix truck. It is believed that about 0.5 to about 1.5 and upto about 3.0 pounds of composition can be uniformly dispersed in eight cubic yards of concrete slurry in a ready mix truck in a time of about 5 to about 7 minutes. It is believed that the viscous nature of the sol not only helps to lubricate the solids in the slurry to thereby promote the ball bearing effect referred to previously, but also helps to prevent water loss and solids separation to thereby promote complete hydration of the hydraulic cement.

As a pumping aid the composition of this invention functions as an additive for a concrete slurry which enables, improves, or at least enhances, the ability of the slurry to flow. Thus by this invention there is provided an improved method of formulating a flowable concrete slurry consisting essentially of the steps of mixing solid ingredients comprised of hydraulic cement and aggregate with water for a time sufficient to uniformly disperse the solid ingredients in the water to thereby formulate said concrete slurry; wherein the improvement consists in the steps of adding to and mixing with the concrete slurry a composition comprised of a water soluble, inorganic, alkaline material and a solvatable, organic polymeric material in an amount in the range of from about 1 pound of composition per 1,000 pounds to about 1 pound of composition per 165,000 pounds of concrete slurry. The concentration of the alkaline material in the composition is an amount in the range of from about 40 to about 99 parts per 100 parts by weight of composition and the concentration of the polymeric material in the composition is an amount in the range of from about 1 to about 60 parts per 100 parts by weight of the composition.

It should be apparent from the above that the composition of this invention can be employed in any given placement operation as both a pumping aid and as a priming aid, in that addition of the composition directly to the slurry together with mixing provides the slurry with internal lubrication and water loss control, while addition of the composition to the pump provides the slurry with external lubrication and water loss control.

As previously mentioned, it is the practice in the art to express the quantity of composition to be utilized as a priming aid in terms of pounds of composition per gallon of water. In this connection the composition is preferably employed in field operations prepackaged in 0.5 pound quantities. Accordingly, 0.5 pounds of a preferred blend of the composition of this invention can be placed in a water soluble bag, a specified number of such bags are then added to a specified number of gallons of water, the bags and water are then mixed and allowed to set for a period of time to yield viscosity to thus produce the desired sol.

In one preferred embodiment one water soluble bag containing 0.5 pounds of a preferred composition of this invention can be mixed with five gallons of water to produce a priming aid which will treat about 100 feet of five-inch diameter conduit. This fluid can be easily prepared for use at the location of the concrete pump by merely mixing the bag and water in the hopper for about one minute followed by at least about 5 minutes of set time to permit the bag to dissolve and release the composition and permit the sol thereby produced to yield satisfactory viscosity. Pumping can proceed at the termination of the set time.

Water soluble bags found to be particularly useful herein are disclosed and claimed in U.S. Pat. No. 4,961,790 to Smith et al and in U.S. Pat. No. 5,120,367 to Smith et al.

It is not a requirement of the broad aspect of this invention that the composition of this invention be used in prepackaged water soluble bags, but use of such bags in actual field practice greatly simples priming and pumping operations encountered in the field.

The term "solvatable, organic polymeric material," as used herein, means and includes a wide variety of natural, modified natural, and synthetic hydrophilic polymers which either dissolve in water or which at least form colloidal dispersions in the presence of water wherein the effect of such solvation is to produce an increase in the viscosity of the water. Such materials are generally characterized as having high molecular weight and are sometimes referred to in the art as "aqueous gelling agents" and sometimes as "aqueous viscosifiers."

The polymeric materials, as defined above, have molecular weights in the range of from about 60,000 to about 4,000,000 and higher and include polysaccharides, examples of which include galactomannan gums and glucomannan gums, which are naturally occurring; cellulose derivatives, which is cellulose modified by reaction with hydrophilic constituents; galactomannan and glucomannan gums which have been modified by reaction with hydrophilic constituents; and synthetic hydrophilic polymers.

Examples of hydrophilic constituents include hydroxyalkyl groups, carboxyalkyl groups and mixed hydroxyalkyl and carboxyalkyl groups to form ether derivatives. Other constituent groups which lend hydrophilic properties to polymers include cis-hydroxyl, hydroxyl, carboxyl, sulfate, sulfonate, amino and amide groups.

Guar gum, locust bean gum, karaya gum, carboxymethylguar, hydroxyethylguar, hydroxypropylguar, carboxymethylhydroxyethylguar, carboxymethylhydroxypropylguar, carboxymethylcellulose, carboxymethylhydroxyethylcellulose, hydroxyethylcellulose, starches, alginates and carrageenans are examples of natural and modified polymeric materials useful herein.

Examples of synthetic hydrophilic polymers and copolymers useful in the composition of this invention include polyethylene oxide, polypropylene oxide, polyacrylate, polymethacrylate, polyacrylamide, polymethacrylamide and copolymers thereof, maleic anhydride/methylvinyl ether copolymers, polyvinyl alcohol, polyvinylpyrrolidone, polyvinylacetate, copolymers of acrylamide and 2-acrylamido, 2-methylpropane sulfonic acid and copolymers of N,N-dimethylacrylamide and 2-acrylamido, 2-methylpropane sulfonic acid.

The solvatable, organic polymeric material useful herein can be either a single polymer or copolymer or a mixture of polymers and copolymers. A preferred such mixture features the presence of a modified natural polymer as mentioned above and a synthetic hydrophilic polymer as mentioned above wherein the weight ratio of synthetic polymer to modified natural polymer is an amount in the range of from about 1 to 1 to about 2 to 1.

Modified natural polymers preferred for use herein are cellulose ethers, such as carboxymethylcellulose and hydroxyethylcellulose and particularly those having a molecular weight of less than about 100,000. Synthetic hydrophilic polymers preferred for use herein are poly(ethylene oxide) resins having a molecular weight of about 4,000,000. Examples of such resins are sold under the trademark POLYOX by Union Carbide Corporation.

Since polyethylene oxide, when in water solution, is referred to as poly(ethylene ether) glycol or, more simply, as polyethylene glycol, such compounds are within the scope of this invention.

The inorganic, alkaline material useful herein includes alkali metal hydroxides, carbonates and bicarbonates, preferably the alkali metal carbonates and still more preferably sodium carbonate.

The composition preferred for use herein as a priming aid and as a pumping aid is a dry blend consisting essentially of an alkali metal carbonate, polyethylene oxide and a cellulose ether wherein the alkali metal carbonate is present in the composition in an amount in the range of from about 80 to about 90 parts per 100 parts by weight of the composition with the balance of the composition being selected from polyethylene oxide and a cellulose ether in various weight proportions, as previously stated, wherein the total quantity of the polymeric constituent present in the composition is an amount in the range of about 10 to about 20 parts per 100 parts by weight of the composition. The most preferred composition contains about 84.375 parts by weight sodium carbonate, about 9.375 parts by weight polyethylene oxide and about 6.25 parts by weight hydroxyethycellulose.

The most preferred composition is conveniently, and thus preferably, employed, in accordance with the disclosed priming and pumping methods of this invention, in 0.5 pound quantities, prepackaged in water soluble bags, as described above.

The term "hydraulic cement," as used herein, means all inorganic cementitious materials of known type which comprise compounds of calcium, aluminum, silicon, oxygen, and/or sulfur which exhibit "hydraulic activity," that is, which set solid and harden in the presence of water. Cements of this type include common Portland cements, fast setting or extra fast setting, sulfate resistant cements, modified cements, alumina cements, high alumina cements, calcium aluminate cements and cements which contain secondary components such as fly ash, pozzolana and the like.

Portland cements are classified by the American Society of Testing Materials (ASTM) into five major types identified by Roman Numerals I, II, III, IV and V and by the American Petroleum Institute into at least 9 categories identified by the letters A, B, C, D, E, F, G, H and J. The classifications are based on chemical composition and physical properties.

The term "hydraulic cement," as used herein, also includes a material identified as slag and mixtures thereof with Portland cement.

"Slag," as used herein, means a granulated, non-crystalline, glassy material having a particle size in the range of from about 1 to about 100 microns which exhibits hydraulic activity. Slag is a blast furnace, by-product formed in the production of cast iron and is broadly comprised of the oxidized impurities found in iron ore.

The hydraulic cement useful herein can also include small particle size cement which consists of discrete particles of hydraulic cement having diameters no larger than about 30 microns. Small particle size cement is more fully discussed in Ewert, et al., U.S. Pat. No. 5,121,795.

The quantity of water employed in the formulation of a concrete slurry useful herein is dependent upon the particle size of the cement employed. Thus, the quantity of water employed is an amount in the range of from about 0.25 to about 5.0 pounds of water per pound of dry hydraulic cement. For cements having a particle size of less than about 45 microns the preferred water to cement ratio is in the range of from about 1.0 to about 2.0 pounds of water per pound of cement. For cements which have a particle size greater than about 45 microns the preferred water to cement ratio is in the range of from about 0.3 to about 0.6 pounds of water per pound of dry cement.

The quantity of aggregate employed in the formulation of a concrete slurry useful herein is an amount in the range of from about 3 to about 15 pounds of aggregate per pound of dry cement. The aggregate may be entirely coarse aggregate or entirely fine aggregate or any blend thereof.

EXAMPLES

The following examples are provided to illustrate the practice of the invention as well as certain preferred embodiments thereof. The examples should not be construed as limiting in any way the spirit or scope of the invention and are not provided as such a limitation.

Example 1

Experiments were conducted to determine the effect of the additive of this invention on certain of the properties of concrete. Two slurries were prepared. The sole difference between them was that one, Formulation A, did not include the additive of this invention, but the second, Formulation B, did contain the additive of this invention. The specific recipes of Formulations A and B are provided in Table I, below. The ingredients were wet mixed, in accordance with recognized industry standards, to obtain concrete slurries having solids uniformly dispersed in water.

The test results are provided in Tables II and III, below. Table II reports the test results obtained on the concrete slurry. Table III reports the test results obtained on the set concrete.

TABLE I

| | Formulation, 4 cubic yards | |
|---|---|---|
| Ingredient | A pounds | B pounds |
| Portland Cement, ASTM Type I[1] | 2256 | 2256 |
| Fine Aggregate[2] | 5036 | 5036 |
| Coarse Aggregate[3] ¾" | 6956 | 6956 |
| Lubricant[3] | 0 | 0.5 |
| Water | 1128 | 1128 |

TABLE II

| | Slurray Data | | | | |
|---|---|---|---|---|---|
| Formu-lation | slump[5] inches | entrained[4] air % | temperature, °F. concrete | air | initial set[5] hours |
| A | 4 | 5.6 | 76 | 75 | 3.22 |
| B | 4.5 | 5.6 | 76 | 77 | 3.3 |

TABLE III

| | Compressive Strength[7], lb/in$^2$ Test Age, days | | | |
|---|---|---|---|---|
| Formulation | 1 | 3 | 7 | 28 |
| A | 1500 | 2290 | 2860 | 4290 |
| B | 1580 | 2470 | 3130 | 4570 |

Footnotes for Tables I, II and III:
[1]Lone Star Cement Company.
[2]Stand. Spec. For Concrete Aggregates ASTM C 33-92a.
[3]Sodium carbonate 84.375%, polyethylene oxide 9.375%, Hydroxyethyl cellulose 6.25%.
[4]ASTM C 231-91b.
[5]ASTM C 403-92.
[6]ASTM C 143-90a
[7]ASTM C 39-86

From the above results, as shown in Tables II and III, it is clear that the additive of this invention, identified as the lubricant in Table I, above, caused no detrimental effects on the workability, entrained air content, setting time or compressive strength of a concrete containing the additive as compared with a concrete of identical recipe which did not contain the additive.

With regard to the compressive strength data provided in Table III, it is noted that the strength data provided are the average results obtained of two or more break tests.

It is further noted that the lubricant employed in Formulation B, above, was a mixture of dry, particulate, ingredients, as described in footnote 3, above, wherein the entire quantity thereof employed was contained in a water-soluble container which was added, as such, to and wet-mixed with the balance of the ingredients of Formulation B in a conventional wet-mixer apparatus. The water soluble container employed is disclosed and claimed in U.S. Pat. No. 4,961,790 to Smith et al and in U.S. Pat. No. 5,120,367 to Smith et al.

Example 2

Tests were conducted on various compositions to determine the suitability of the compositions as pumping aids and/or as priming aids for concrete slurries.

The tests were conducted by mixing a quantity of each composition tested with five gallons (41.65 pounds) of potable water to thus produce a fluid having a concentration in the range of from about 0.19 to about 1.19 percent composition by weight of fluid. Each test fluid was prepared by manually stirring it for sixty seconds immediately upon mixing the water and composition, then allowing it to set, undisturbed, for five minutes and thereafter manually stirring it for an additional sixty second period. Each fluid was then placed in a Fann viscometer (Model 35A, Rotor-Bob R1B1, with a 1" spring) and apparent viscosity readings were taken at shear settings of 600, 300, 200 and 100 rpm at 77° F. Visual observations of the fluids were made.

The ingredients of the compositions tested are set out in Table IV, below. It is noted that composition A is water and is provided for control purposes only. Compositions B, C, D, and E are examples of the composition of this invention.

The apparent viscosity test results and visual observations are set out in Table V, below.

It is noted that compositions B through J, below, were dry, particulate, materials wherein the entire quantity of each employed was contained in a water-soluble container which was added, as such, to and mixed with water as described above. The water soluble container employed is disclosed and claimed in U.S. Pat. No. 4,961,790 to Smith et al and in U.S. Pat. No. 5,120,367 to Smith et al.

TABLE IV

| COMPO-SITION | INGREDIENTS, percent by weight of composition (pounds of ingredient) | | | |
|---|---|---|---|---|
| | sodium carbonate | polyethylene oxide | hydroxyethyl cellulose | carboxymethyl cellulose |
| A | 0 | 0 | 0 | 0 |
| B | 84.375 (0.421875) | 9.375 (0.046875) | 6.25 (0.03125) | 0 |
| C | 84.375 (0.421875) | 15.625 (0.078125) | 0 | 0 |
| D | 87.5 (0.4375) | 6.25 (0.03125) | 6.25 (0.03125) | 0 |
| E | 87.5 (0.4375) | 6.25 (0.03125) | 0 | 6.25 (0.03125) |
| F | 0 | 100.00 (0.5) | 0 | 0 |
| G | 0 | 0 | 100.00 (0.5) | 0 |
| H | 0 | 60.00 (0.046875) | 40.00 (0.03125) | 0 |
| I | 0 | 100.00 (0.078125) | 0 | 0 |
| J | 0 | 0 | 100.00 (0.078125) | 0 |

TABLE V

| COMPOSITION | FANN VISCOSITY @ specified rpm | | | | OBSERVATION |
|---|---|---|---|---|---|
| | 600 | 300 | 200 | 100 | |
| A | 1 | 0.5 | 0 | 0 | clear water, one phase, thin (very low viscosity) fluid |
| B | 55 | 30 | 17 | 8 | slick, slimy, thick uniform fluid, one phase |
| C | 60 | 40 | 31 | 19 | same as B |
| D | 10 | 5 | 3 | 1 | slick, oily, thin uniform fluid, one phase |
| E | 16 | 12 | 7 | 3 | same as D |

TABLE V-continued

| COMPOSITION | FANN VISCOSITY @ specified rpm | | | | OBSERVATION |
|---|---|---|---|---|---|
| | 600 | 300 | 200 | 100 | |
| F | 4 | 2 | 1 | 0 | non-uniform, watery fluid with undispersed clumps of material[1], two phase |
| G | 3 | 1 | 0.5 | 0 | same as F |
| H | 2 | 1 | 0.5 | 0 | same as F |
| I | 2 | 1 | 0.5 | 0 | same as F |
| J | 2 | 1 | 0 | 0 | same as F |

Footnote: [1]Referred to in the art as a "fish-eye," an agglomeration consisting of a polymer mass wetted on the exterior, having dry, unsolvated material on the interior.

From the above it is seen that the composition of this invention, when mixed with water, produces a uniform, one phase fluid, having no undispersed masses of material, a viscosity greater than that of water, and consist of at least one solvatable, organic polymeric material and a soluble alkaline material.

Example 3

A large volume of dirt had apparently washed out from underneath a portion of the concrete floor of an industrial plant, thereby producing a void space under the floor. The plant owner estimated that 500 cubic yards of material would be required to fill the void and, further, wanted the placement of the material to be performed without interrupting the operation of the plant. A cement slurry pumping method was, therefore, indicated in order to comply with the owner's wishes. However, the material specified for placement in the void was a concrete slurry which did not contain sufficient hydraulic cement to enable pumping by employing conventional methods.

The recipe specified by the owner to produce 1 cubic yard of concrete slurry is set out below:
Portland cement, ASTMType I . . . 100 pounds
Coarse aggregate . . . 0 pounds
Fine aggregate . . . 2700 pounds
Class C Fly Ash . . . 300 pounds
Water . . . 300 pounds
Air entraining additive . . . 10 fluid ounces (aqueous dispersion of Vinsol resin, a registered trademark of Hercules, Incorporated)

The above concrete slurry, which had a design compressive strength after setting of about 100 psi, is referred to in the art as a "flowable fill" and also as a "controlled density, low strength material." It is believed that a concrete slurry having a design compressive strength after setting of less than about 500 psi cannot be pumped and one having a design compressive strength after setting of between about 500 and 2500 psi is extremely difficult to pump.

The alternative to placing the flowable fill by means other than by pumping involved drilling holes through the plant floor to establish communication with the void, transporting the slurry by means of buggies over the plant floor to the holes and then placing the slurry through the holes. This process consumed seven days at eight to ten hours per day with consequent disruption in plant operations.

The flowable fill, as described above, was enabled to be pumped by use of the composition of this invention. In this regard, the flowable fill was prepared at a remote location in batches of eight to ten cubic yards and transported to the location of the concrete pump by conventional ready mix trucks. To each ready mix load of flowable fill there was added a quantity of the pumping aid of this invention as defined in Table IV, Composition B. As stated in Example 2, the pumping aid added to each batch was entirely contained in water soluble bags. Each bag contained 0.5 pounds of the composition of this invention, wherein one bag was added per each two cubic yards of flowable fill in each ready mix load. Accordingly, four bags (2 pounds) were added to an eight cubic yard load (27,200 pounds) and five bags (2.5 pounds) were added to a ten cubic yard load (34,000 pounds). The contents of each bag were sufficiently dispersed thoughout the batch by normal operation of the conventional mixing means on the ready mix truck.

The entire 500 cubic yards of flowable fill was pumped in six hours. The operation of the plant was not interrupted.

Having thus described the invention, that which is claimed is:

1. In the method of formulating a flowable concrete slurry comprised of the steps of mixing solid ingredients comprised of hydraulic cement and aggregate with water for a time sufficient to uniformly disperse said solid ingredients in said water to thereby make said concrete slurry;

the improvement consisting of adding to said solid ingredients and water an additive comprised of a water soluble, inorganic, alkaline material and a solvatable, organic polymeric material wherein said additive is added in an amount in the range of from about 1 pound per 1,000 pounds to about 1 pound per 165,000 pounds of said solid ingredients and water.

2. The method of claim 1 wherein the concentration of said alkaline material in said additive is an amount in the range of from about 40 to about 99 parts per 100 parts by weight of said additive and the concentration of said polymeric material in said additive is an amount in the range of from about 1 to about 60 parts per 100 parts by weight of said additive.

3. The method of claim 2 wherein said concentration of said alkaline material is in the range of from about 60 to about 90 and the concentration of said polymeric material is in the range of from about 10 to about 40.

4. The method of claim 3 wherein said organic polymeric material is selected from the group consisting of high molecular weight polymers, copolymers and mixtures thereof which disperse in the presence of water to produce an increase in the viscosity of said water and wherein said alkaline material is selected from the group consisting of alkali metal hydroxides, carbonates, bicarbonates and mixtures thereof.

5. The method of claim 4 wherein said organic polymeric material is selected from the group consisting of galactomannan gums, glucomannan gums and cellulose derivatives.

6. The method of claim 5 wherein said cellulose derivative is hydroxyethylcellulose present in said additive in the amount of 6.25 pounds per 100 pounds of said additive, said synthetic hydrophilic polymer is polyethylene oxide present in said additive in the amount of 9.375 pounds per 100 pounds of said additive and said alkali metal carbonate is sodium carbonate is present in said additive in the amount of 84.375 pounds per 100 pounds of said additive.

7. A concrete slurry comprised of hydraulic cement, aggregate, water and an additive comprised of a water soluble, inorganic, alkaline material and a solvatable, organic polymeric material wherein said additive is present in said concrete slurry in an amount in the range of from about 1 pound per 1000 pounds to about 1 pound per 165,000 pounds of said hydraulic cement, aggregate and water, and wherein the concentration of said alkaline material in said additive is an amount in the range of from about 40 to about 99 parts per 100 parts by weight of said additive and the concentration of said polymeric material in said additive is an amount in the range of from about 1 to about 60 parts per 100 parts by weight of said additive.

8. The concrete slurry of claim 7 wherein said organic polymeric material is selected from the group consisting of high molecular weight polymers, copolymers and mixtures thereof which disperse in the presence of water to produce an increase in viscosity of said water and wherein said alkaline material is selected from the group consisting of alkali metal hydroxides, carbonates, bicarbonates and mixtures thereof.

9. The concrete slurry of claim 7 wherein said organic polymeric material consists essentially of a mixture of at least one synthetic hydrophilic polymer and a material selected from the group consisting of natural polymers, natural polymers modified by reaction with hydrophilic constituents and mixtures thereof.

10. The concrete slurry of claim 9 wherein said natural polymers are selected from the group consisting of galactomannan gums, glucomannan gums and mixtures thereof, said modified natural polymers are selected from the group consisting of cellulose derivatives, galactomannan gums and glucomannan gums which have been modified by reaction with hydrophilic constituents, and mixtures thereof, and said alkaline material is an alkali metal carbonate.

11. The concrete slurry of claim 10 wherein the weight ratio of said synthetic hydrophilic polymer to said modified natural polymer is an amount in the range of from about 1 to 1 to about 2 to 1.

12. The concrete slurry of claim 11 wherein said modified natural polymers are cellulose derivatives selected from the group consisting of hydroxyethylcellulose, carboxymethylcellulose and mixtures thereof, said synthetic hydrophilic polymer is polyethylene oxide, and said alkali metal carbonate is sodium carbonate.

13. The method of claim 4 wherein said organic polymeric material is selected from the group consisting of glactomannan gums and glucomannan gums which have been modified by reaction with hydrophilic constituents and wherein said alkaline material is an alkali metal carbonate.

* * * * *

UNITED STATES PATENT AND TRADEMARK OFFICE
CERTIFICATE OF CORRECTION

PATENT NO. : 5,443,636
DATED : August 22, 1995
INVENTOR(S) : Daniel P. Montgomery It is certified that error appears in the above-indentified patent and that said Letters Patent is hereby corrected as shown below:

At Column 14, Claim 13, line 3, delete [glactomannan] and insert --galactomannan--.

At Column 14, Claim 13, line 5, after "constituents" insert --, synthetic hydrophilic polymers and mixtures thereof,--.

Signed and Sealed this

Twenty-third Day of September, 1997

*Attest:*

BRUCE LEHMAN

*Attesting Officer*   *Commissioner of Patents and Trademarks*

REEXAMINATION CERTIFICATE (3811th)

United States Patent [19]
Montgomery

[11] B1 5,443,636
[45] Certificate Issued Jul. 13, 1999

[54] COMPOSITION FOR AND METHOD OF PUMPING CONCRETE

[75] Inventor: Daniel P. Montgomery, Mesquite, Tex.

[73] Assignee: Fritz Industries, Inc., Mesquite, Tex.

Reexamination Request:
No. 90/005,016, Jun. 12, 1998

Reexamination Certificate for:
Patent No.: 5,443,636
Issued: Aug. 22, 1995
Appl. No.: 08/282,879
Filed: Jul. 29, 1994

Certificate of Correction issued Sep. 23, 1997.

[51] Int. Cl.$^6$ ..................................................... C04B 24/10
[52] U.S. Cl. ........................ 106/805; 106/724; 106/729; 106/730; 106/804; 106/197.01; 524/650
[58] Field of Search ..................................... 106/724, 729, 106/730, 802, 804, 805, 197.01; 524/2, 650

[56] References Cited

U.S. PATENT DOCUMENTS

| | | |
|---|---|---|
| 3,522,068 | 7/1970 | Bastian . |
| 3,877,522 | 4/1975 | Knight . |
| 4,175,975 | 11/1979 | MacWilliams . |
| 4,265,674 | 5/1981 | Debus . |
| 4,687,516 | 8/1987 | Burkhalter . |
| 5,203,629 | 4/1993 | Valle . |
| 5,342,445 | 8/1994 | Kiyomoto . |

*Primary Examiner*—Michael Marcheschi

[57] ABSTRACT

A composition for and a method of promoting the flow of a concrete slurry through a pump and a conduit is provided. The composition is a dry particulate mixture comprised of a water soluble, inorganic material and a solvatable, organic polymer. The composition, when mixed with a suitable quantity of water, is useful in a method of priming a pump used to pump a concrete slurry. The composition, when mixed with a concrete slurry, is useful to improve the flow of the slurry through a conduit.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 3, 4 and 8 are cancelled.

Claims 1 and 7 are determined to be patentable as amended.

Claims 5, 6 and 9–13, dependent on an amended claim, are determined to be patentable.

1. In the method of [formulating] *making* a flowable concrete slurry [comprised of the steps of] *comprising*;
   mixing solid ingredients comprised of [hydraulic] *Portland* cement and aggregate with water for a time sufficient to uniformly disperse said solid ingredients in said water to thereby make said concrete slurry;
   the improvement consisting of,
   adding to [said solid ingredients and water] *and mixing with said concrete slurry* an additive [comprised] *consisting essentially* of a water soluble, inorganic, alkaline material and a solvatable, organic polymeric material *for a time sufficient to obtain a uniform dispersion of said additive in said concrete slurry*;
   wherein said additive is [added] *present in said concrete slurry* in an amount in the range of from about 1 pound of said additive per [1,000] *10,000* pounds *of said concrete slurry* to about 1 pound *of said additive* per 165,000 pounds of said [solid ingredients and water.] *concrete slurry, said organic polymeric material is present in said additive in an amount in the range of from about 1 to about 20 parts per 100 parts by weight of said additive and said alkaline material is present in said additive in an amount in the range of from about 80 to about 99 parts per 100 parts by weight of said additive;*
   *said organic polymeric material is a high molecular weight polymer which disperses in the presence of water to produce an increase in the viscosity of said water and is selected from the group consisting of galactomannan gums, glucomannan gums, cellulose derivatives, synthetic hydrophilic polymers, galactomannan and glucomannan gums which have been modified by reaction with hydrophilic constituents, and mixtures thereof, and*
   *said alkaline material is comprised of alkali metal carbonates and bicarbonates.*

7. A concrete slurry comprised of [hydraulic] *Portland* cement, aggregate, water and an additive [comprised] *consisting essentially* of a water soluble, inorganic, alkaline material and a solvatable, organic polymeric material;
   wherein said additive is present in said concrete slurry in an amount in the range of from about 1 pound per [1000] *10,000* pounds to about 1 pound per 165,000 pounds of said [hydraulic] *Portland* cement, aggregate and water[, and]*;*
   [wherein the concentration of] said alkaline material *is present* in said additive [is] *in* an amount in the range of from about [40] *80* to about 99 parts per 100 parts by weight of said additive and [the concentration of] said *organic* polymeric material *is present* in said additive [is] *in* an amount in the range of from about 1 to about [60] *20* parts per 100 parts by weight of said additive[.]
   *and further wherein said organic polymeric material is a high molecular weight polymer which disperses in the presence of water to produce an increase in the viscosity of said water and is selected from the group consisting of natural polymers, natural polymers modified by reaction whth hydrophilic constituents, synthetic hydrophilic polymers, and mixtures thereof, and wherein said alkaline material is selected from the group consisting of alkali metal carbonates, bicarbonates and mixtures thereof.*

* * * * *